United States Patent [19]

Peterson et al.

[11] 4,396,031
[45] Aug. 2, 1983

[54] METHOD FOR RESTRICTING UNCONTROLLED FLUID FLOW THROUGH A PIPE

[75] Inventors: Marvin L. Peterson; Orwin G. Maxson; Adolph A. Sutko, all of Ponca City, Okla.

[73] Assignee: Conoco Inc., Ponca City, Okla.

[21] Appl. No.: 223,171

[22] Filed: Jan. 7, 1981

[51] Int. Cl.³ .................................................. F17D 1/14
[52] U.S. Cl. ........................................ 137/13; 137/340
[58] Field of Search ................ 137/13, 828, 340, 251; 166/57, 302; 165/142

[56] References Cited

U.S. PATENT DOCUMENTS

| | | | |
|---|---|---|---|
| 3,498,071 | 3/1970 | Tremont | 137/340 X |
| 3,631,928 | 1/1972 | Dalzell | 166/285 |
| 3,647,000 | 3/1972 | Rowley et al. | 166/285 |
| 3,738,424 | 6/1973 | Osmun et al. | 166/298 |
| 3,827,282 | 6/1974 | Brister | 73/40.5 R |
| 4,082,109 | 4/1978 | Sun | 137/340 |
| 4,125,159 | 11/1978 | Vann | 166/285 |
| 4,203,472 | 5/1980 | Dulaney | 137/340 X |
| 4,222,824 | 9/1980 | Flockenhaus | 165/142 X |

OTHER PUBLICATIONS

Staff, "Quick Freeze Plug Reduces Testing and Repair Costs", Pipe Line Industry, pp. 37–39, Mar. (1977).
R. P. Deplancke, "How the Frozen Plug Method Found an Elusive Pipeline Leak", Petrochemical International, Col. XII, No. 1, pp. 46–47, Jan. (1972).
Don W. Noren, "A Cure for Mold Cooling Headaches", Plastics Technology, pp. 122–125, Apr. (1978).
Staff, "Stepped Thermal Pin Heat Conductors", Thermal Pin Design News, pp. 2–3, vol. 1, No. 3.

*Primary Examiner*—Alan Cohan
*Attorney, Agent, or Firm*—Stephen A. Littlefield

[57] ABSTRACT

A method for restricting uncontrolled fluid flow through a pipe by positioning a heat conductor through the pipe wall and in contact with fluid flowing through the pipe and cooling the heat transfer surfaces of the heat conductor to freeze a portion of the flowing fluid on the heat transfer surfaces. The freezing is continued to form a plug which substantially restricts or stops flow through the pipe.

1 Claim, 4 Drawing Figures

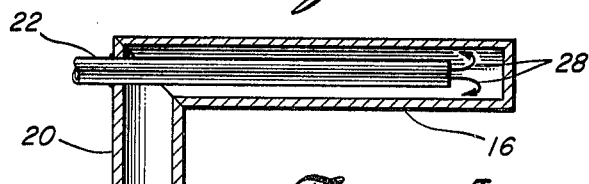
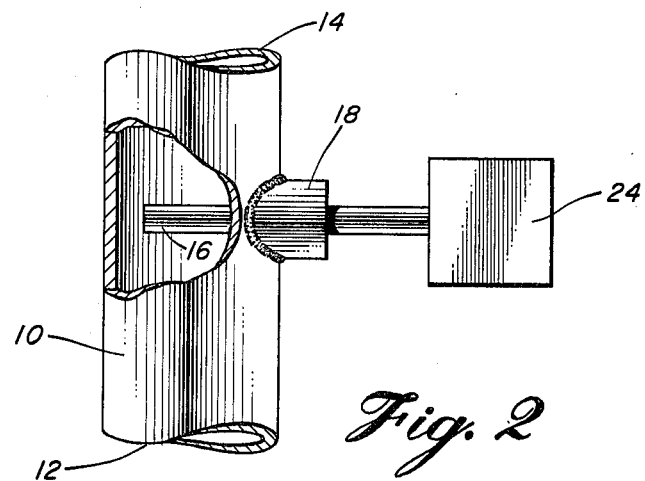
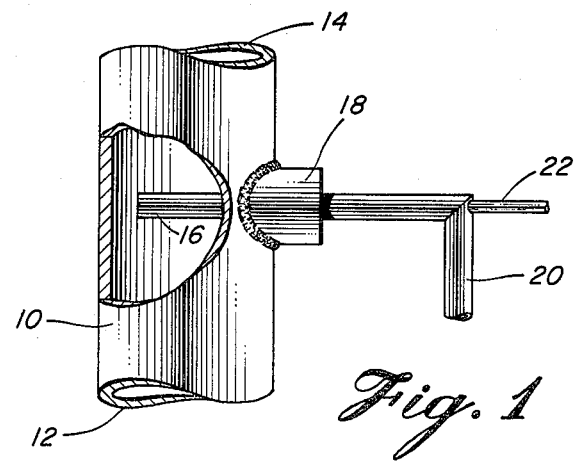

METHOD FOR RESTRICTING UNCONTROLLED FLUID FLOW THROUGH A PIPE

This invention relates to methods for restricting uncontrolled fluid flow through pipes.

In many industrial applications, particularly in the petroleum industry, uncontrolled fluid flow through pipes is a problem. These problems may occur in pipelining operations where fluids are transported for long distances through pipes upon rupture of the pipe or the like. In such instances, if the fluid flowing through the pipe is under high pressure it may be highly desirable that a method be available for restricting or stopping the flow of fluid through the pipe near the point of discharge. Similar problems arise in connection with the production of petroleum from subterranean formations where blowouts can result in significant losses of petroleum materials which constitute a pollutant, a fire hazard and the like. A considerable amount of effort has been directed to the development of methods for restricting the flow from such pipes. In the case of pipes used for the production of petroleum from subterranean formations, prior art methods have comprised plugging the uncontrolled wells by drilling additional wells and pumping vast amounts of plugging material such as cement into the producing formation to shut off the flow, by blasting to extinguish fires at the point of discharge of the petroleum fuels and the like. A further method used with pipelines has been the use of cryogenic materials to freeze the fluids in the pipe to restrict flow. All these methods suffer certain disadvantages. For instance, the use of massive amounts of cement are highly detrimental to producing formations when used to shut off the flow as discussed above. Further, such techniques require a substantial period of time and equipment and result in an inability to control the flow through the pipes for a substantial period of time. The use of cryogenic materials is difficult when offshore subsea applications are contemplated and further the use of such materials while they may not damage the pipe material per se, do cause structural steel materials to be completely brittle so that in such a condition relatively minor flaws, cracks or other material defects could result in catastrophic brittle failure. Further the handling of such materials could be dangerous to personnel.

As a result, a continuing search has been directed to the development of improved methods for restricting uncontrolled fluid flow through pipes in the event of catastrophies such as well blowouts, pipeline ruptures or the like. It has now been found that such unrestricted flow can be readily controlled by a method which consists essentially of positioning a heat conductor through the wall of the pipe and in heat transfer contact with the flowing fluid and cooling the heat transfer surfaces of the heat conductor to freeze portions of the flowing fluid on the heat transfer surfaces.

FIG. 1 is a schematic diagram of an embodiment of the present invention wherein a tubular heat conductor is positioned in a pipe;

FIG. 2 is a schematic diagram of a similar apparatus utilizing a different type of tubular heat conductor;

FIG. 3 is a schematic diagram of a heat pipe; and

FIG. 4 shows a tubular heat conductor of the type shown in FIG. 1.

In the discussion of the Figures, the same numbers will be used to refer to the same or similar components throughout the discussion.

In FIG. 1, a pipe through which fluids are flowing in a direction from a first end 12 of pipe 10 to a second end 14 of pipe 10 is shown. A heat conductor 16 is positioned through a fitting 18 in the wall of pipe 10 to expose a portion of the surfaces of heat conductor 16 to the fluid flowing through pipe 10. Heat conductor 16 shown in FIG. 1 is described in greater detail in FIG. 4. Heat conductor 16 comprises an outer tube 20 and an inner tube 22. In the use of heat conductor 16, a cooled fluid or a fluid which cools by evaporation etc. is passed through inner tube 22 to discharge inside outer tube 20 as shown by arrows 28. As a result, outer tube 20 is cooled and serves to remove heat via the walls of outer tube 20 from the flowing fluid. The cooling fluid is removed by the discharge of the cooling fluid through outer tube 20. In such an embodiment, liquid nitrogen, cooled carbon dioxide, FREON[1] coolants or other refrigerant materials could be used to cool the outer surfaces of heat conductor 16. Such an embodiment is shown in FIG. 1. In the use of such an apparatus, a tap through the wall of pipe 10 is accomplished by means known to those skilled in the art such as for instance a hot tap procedure as described in U.S. Pat. No. 3,647,000. Methods for positioning a heat conductor through the sidewalls of pipes are considered to be well-known to those skilled in the art and will not be discussed further except to note that hot taps as discussed in U.S. Pat. No. 3,647,000 are usable in many applications including subsea applications. As heat conductor 16 is cooled, the fluid flowing through pipe 10 tends to freeze on the heat transfer surfaces of heat conductor 16. Typically the fluids flowing through pipe 10 will contain at least minor quantities of water. Such is the case with most subterranean petroleum deposits and the like. The fluids frozen may be paraffins, asphaltenes, heavy crudes or the like either as such or in mixture with water. Such organic materials may tend to congeal rather than freeze, but effective plugging is still achieved. Water is preferred as the fluid to be frozen since it is more conductive than most organic crude oil constituents. In the event that insufficient water is present in the flowing fluid to freeze on the surfaces of heat conductor 16, water can be added up stream of heat conductor 16 so that water is available in the flowing fluid stream to freeze on heat conductor 16. As the fluid continues to flow, additional quantities of liquid freeze on the surfaces of heat conductor 16 restricting flow through pipe 10. In addition to the cooling achieved by the heat transfer through the side walls of heat conductor 16, additional cooling begins to be accomplished by the venturi effect accomplished as a result of the partial plugging of pipe 10. As a net result, it is possible to substantially completely plug pipes by the method of the present invention.

[1]Trademark of E. I. DuPont de Nemours & Co.

The present invention offers a method whereby uncontrolled fluid flow through pipes can be readily controlled by the use of apparatus which can be installed after a catastrophy occurs and at locations relatively remote from the escape of the uncontrolled fluid. Such advantages are particularly important when natural gas or similar material is escaping from a pipeline or when well blowouts occur in the production of petroleum from subterranean formations particularly in offshore operations. For instance, it is normally possible to reach portions of the tubing and other pipes communicating the surface of the ocean and the ocean floor even when blowouts occur offshore. In such instances, it will be possible to install the apparatus of the present invention by divers or the like and shut off the flow beneath the sea. In such instances, of course, it will be necessary to transmit a refrigerant fluid or the like downwardly from the ocean surface of the like to accomplish the cooling required in heat conductor 16.

In a variation of the present invention, which is preferred in many instances, a heat conductor referred to as a heat pipe is used. The heat pipe generally comprises a closed tubular member as shown in FIG. 3, filled with a highly conductive gas. Such heat conductors are available to the art and are marketed by Noren Products Inc., 3513 Haven Avenue, Menlo Park, Calif. 94025. Such heat pipe conductors are described in "Stepped THERMAL PIN Heat Conductors" Thermal Pin Design News, Vol. 1, No. 3, and "A New Cure for Mold-Cooling Headaches", Plastics Technology, April 1978, pp. 122-125. The use of THERMAL PIN[2] heat pipes results in the use of a cooling device 24 shown in heat transfer contact with the end of the heat pipe outside pipe 10 in FIG. 2. The operaton of the system is substantially the same as in FIG. 1 except that it is not necessary to pass a heat transfer fluid into heat conductor 16. Merely cooling one end of heat conductor 16 when a heat pipe is used is sufficient.

[2]Trademark of Noren Products Inc., 3513 Haven Avenue, Menlo Park, Calif. 94025

A solid rod of a suitably conductive material such as copper, silver, aluminum alloys and the like may be used instead of a tubular heat conductor.

In the practice of the present invention, while other fluids might be frozen on the heat exchange surfaces of conductor 16, it is believed that water will be the fluid most often chosen for freezing. In some instances, some fluids may become viscous and adhere to the heat conductor surfaces thus plugging flow without freezing. Even in gaseous streams, substantial quantities of water vapor are many times present. In the event that insufficient water is present, additional water can be added as noted above. The use of the method of the present invention results in the ability to stop or substantially restrict uncontrolled fluid flows through pipes without the use of preexisting equipment. In other words, the equipment required to stop the flow can be installed after a catastrophe occurs thereby resulting in the ability to respond quickly to uncontrolled fluid flow through pipes. Clearly a plurality of heat conductors can be used if desired although in most instances it is believed that the use of a single heat conductor will be sufficient. The conductor is chosen to provide adequate heat transfer surface inside pipe 10 yet of a size such that the installation is not inconvenient. The temperature provided at the surface of heat conductor 16 can also vary over wide limits although it is not contemplated that extreme cooling will be required. The determination of the amount of cooling required is readily accomplished by those skilled in the art based upon the temperature of the material flowing through pipe 10, the material to be frozen on the heat exchange surfaces of heat conductor 16, the amount of time available for plugging and the like. Obviously, it may be possible to reduce the amount of heat exchange required in heat conductor 16 after a plug is established.

Having thus described the invention by reference to certain of its preferred embodiments it is respectfully pointed out that many variations and modifications of the present invention are possible and may be considered obvious and desirable by those skilled in the art upon a review of the foregoing description of preferred embodiments.

Having thus described the invention, I claim:

1. A method for restricting uncontrolled flow of a petroleum fluid containing minor amounts of water through a production riser for the production of petroleum from a subterranean formation, said method consisting essentially of
    (a) positioning a heat conductor having a heat exchange surface through the wall of said production riser so that at least a portion of the heat exchange surface is in heat transferring contact with said petroleum fluid containing minor amounts of water within said production riser;
    (b) positioning water injection means adjacent to and upstream of the heat conductor;
    (c) adding water through said upstream water injection means to the petroleum fluid to form the petroleum fluid containing minor amounts of water; and
    (d) cooling the heat exchange surface of the heat conductor to freeze the water in the petroleum fluid on the heat exchange surface, thus restricting the flow through the production riser.

* * * * *